(12) United States Patent
Kume et al.

(10) Patent No.: US 11,545,873 B2
(45) Date of Patent: Jan. 3, 2023

(54) ROTARY ACTUATOR

(71) Applicant: DENSO CORPORATION, Kariya (JP)

(72) Inventors: Mikine Kume, Kariya (JP); Shinji Naito, Kariya (JP)

(73) Assignee: DENSO CORPORATION, Kariya (JP)

(*) Notice: Subject to any disclaimer, the term of this patent is extended or adjusted under 35 U.S.C. 154(b) by 275 days.

(21) Appl. No.: 16/847,953

(22) Filed: Apr. 14, 2020

(65) Prior Publication Data

US 2020/0336043 A1 Oct. 22, 2020

(30) Foreign Application Priority Data

Apr. 16, 2019 (JP) .............................. JP2019-077906

(51) Int. Cl.
*H02K 7/116* (2006.01)
*F16H 1/32* (2006.01)
(Continued)

(52) U.S. Cl.
CPC ............... *H02K 7/116* (2013.01); *F16H 1/32* (2013.01); *F16H 61/32* (2013.01); *H02K 7/083* (2013.01);
(Continued)

(58) Field of Classification Search
CPC ...... H02K 7/116; H02K 7/083; H02K 5/1732; H02K 5/04; H02K 7/10; H02K 11/215;
(Continued)

(56) References Cited

U.S. PATENT DOCUMENTS

2006/0138880 A1* 6/2006 Kimura ................ H02K 11/215
310/179
2007/0145839 A1* 6/2007 Kimura ................ H02K 19/103
310/68 B
(Continued)

FOREIGN PATENT DOCUMENTS

JP 2009-162268 7/2009
JP 2017-203465 11/2017

OTHER PUBLICATIONS

U.S. Appl. No. 16/847,974, to Kannou, et al., entitled: "Rotary Actuator", filed Apr. 14, 2020 (22 pages).
(Continued)

*Primary Examiner* — John K Kim
(74) *Attorney, Agent, or Firm* — Nixon & Vanderhye P.C.

(57) ABSTRACT

A rotary actuator for a shift-by-wire system of a vehicle includes a motor with a motor shaft, an output shaft disposed in parallel with the motor shaft, a speed-reducing mechanism configured to reduce a rotational speed of the motor and transmit the rotation of the motor to the output shaft, and a case housing the motor and the speed-reducing mechanism. The speed-reducing mechanism includes a first speed-reducing portion including a ring gear and a sun gear, and a second speed reducing portion including a drive gear and a driven gear. The drive gear and the driven gear are coaxially disposed with the motor shaft and the output shaft, respectively, to serve as parallel shafts type gears. The drive gear is disposed between the motor and the first speed-reducing portion in an axial direction of the motor.

8 Claims, 4 Drawing Sheets

(51) Int. Cl.
  *F16H 61/32* (2006.01)
  *H02K 7/08* (2006.01)
  *F16H 61/28* (2006.01)

(52) U.S. Cl.
  CPC .. *F16H 2061/283* (2013.01); *F16H 2061/326* (2013.01)

(58) Field of Classification Search
  CPC . H02K 11/30; F16H 1/32; F16H 61/32; F16H 2061/283; F16H 2061/326; F16H 59/08; F16H 63/3466; F16H 2001/327
  USPC .......................................................... 310/83
  See application file for complete search history.

(56) References Cited

U.S. PATENT DOCUMENTS

| | | | | |
|---|---|---|---|---|
| 2008/0007130 | A1* | 1/2008 | Edelson | H02K 41/06 |
| | | | | 310/82 |
| 2009/0009011 | A1* | 1/2009 | Edelson | H02K 41/06 |
| | | | | 310/48 |
| 2009/0189468 | A1* | 7/2009 | Kume | H02K 1/148 |
| | | | | 310/83 |
| 2012/0255385 | A1* | 10/2012 | Nakayama | F16H 19/001 |
| | | | | 74/437 |
| 2013/0234548 | A1* | 9/2013 | Oishi | H02K 29/08 |
| | | | | 29/598 |
| 2015/0159751 | A1* | 6/2015 | Pritchard | B60K 23/0808 |
| | | | | 29/893.1 |
| 2017/0210244 | A1* | 7/2017 | Isono | B60L 15/2009 |
| 2019/0207475 | A1 | 7/2019 | Uematsu et al. | |
| 2019/0229588 | A1 | 7/2019 | Takahashi et al. | |
| 2020/0036266 | A1 | 1/2020 | Uematsu et al. | |
| 2020/0336043 | A1* | 10/2020 | Kume | H02K 7/083 |

OTHER PUBLICATIONS

U.S. Appl. No. 16/847,989, to Kume, et al., entitled: "Rotary Actuator", filed Apr. 14, 2020 (20 pages).
U.S. Appl. No. 16/847,788 to Kume, et al., entitled: "Rotary Actuator", filed Apr. 14, 2020 (22 pages).
U.S. Appl. No. 16/847,801, to Kume, et al., entitled: "Rotary Actuator", filed Apr. 14, 2020 (26 pages).
U.S. Appl. No. 16/847,820, to Kato, et al., entitled: "Rotary Actuator and Method for Manufacturing the Same", filed Apr. 14, 2020 (26 pages).
U.S. Appl. No. 16/847,854, to Naitou, et al., entitled: "Rotary Actuator", filed Apr. 14, 2020 (23 pages).
U.S. Appl. No. 16/847,816, to Imai, et al., entitled: "Rotary Actuator", filed Apr. 14, 2020 (27 pages).
U.S. Appl. No. 16/847,992, to Shimada, et al., entitled: "Rotary Actuator", filed Apr. 14, 2020 (24 pages).
U.S. Appl. No. 16/848,024, to Shimada, et al., entitled: "Rotary Actuator", filed Apr. 14, 2020 (18 pages).
U.S. Appl. No. 16/847,835, to Kannou, et al., entitled: "Rotary Actuator", filed Apr. 14, 2020 (18 pages).

* cited by examiner

ROTARY ACTUATOR

CROSS REFERENCE TO RELATED APPLICATION

This application is based on Japanese Patent Application No. 2019-077906 filed on Apr. 16, 2019, the disclosure of which is incorporated herein by reference in its entirety.

TECHNICAL FIELD

The present disclosure relates to a rotary actuator.

BACKGROUND

A rotary actuator is utilized as a driving unit of a shift-by-wire system for a vehicle. An actuator has two shafts that is a motor shaft of a motor and an output shaft located in parallel with the motor shaft. A speed-reducing mechanism is disposed in a driving force transmitting path extending between the motor and the output shaft. The speed-reducing mechanism includes a first speed-reducing portion formed of a sun gear and a ring gear, and a second-speed reducing portion formed of a drive gear and a driven gear that is connected to the output shaft. The drive gear and the driven gear serve as parallel shafts type gears. A rotational speed of the motor is reduced by the first speed-reducing portion and further reduced by the second reducing portion, and the rotation of the motor is transmitted to the output shaft through the driven gear.

SUMMARY

A rotary actuator is used for a shift-by-wire system of a vehicle. The rotary actuator includes a motor including a motor shaft, an output shaft disposed in parallel with the motor shaft, a speed-reducing mechanism, and a case housing the motor and the speed-reducing mechanism. The speed-reducing mechanism is configured to reduce a rotational speed of the motor and transmit the rotation of the motor to the output shaft. The speed-reducing mechanism includes a first speed-reducing portion including a ring gear and a sun gear, and a second speed-reducing portion including a drive gear and a driven gear. The drive gear and the driven gear are coaxially disposed with the motor shaft and the output shaft, respectively, to serve as parallel shafts type gears. The drive gear is disposed between the motor and the first speed-reducing portion in an axial direction of the motor.

DETAILED DESCRIPTION

Figure 1:
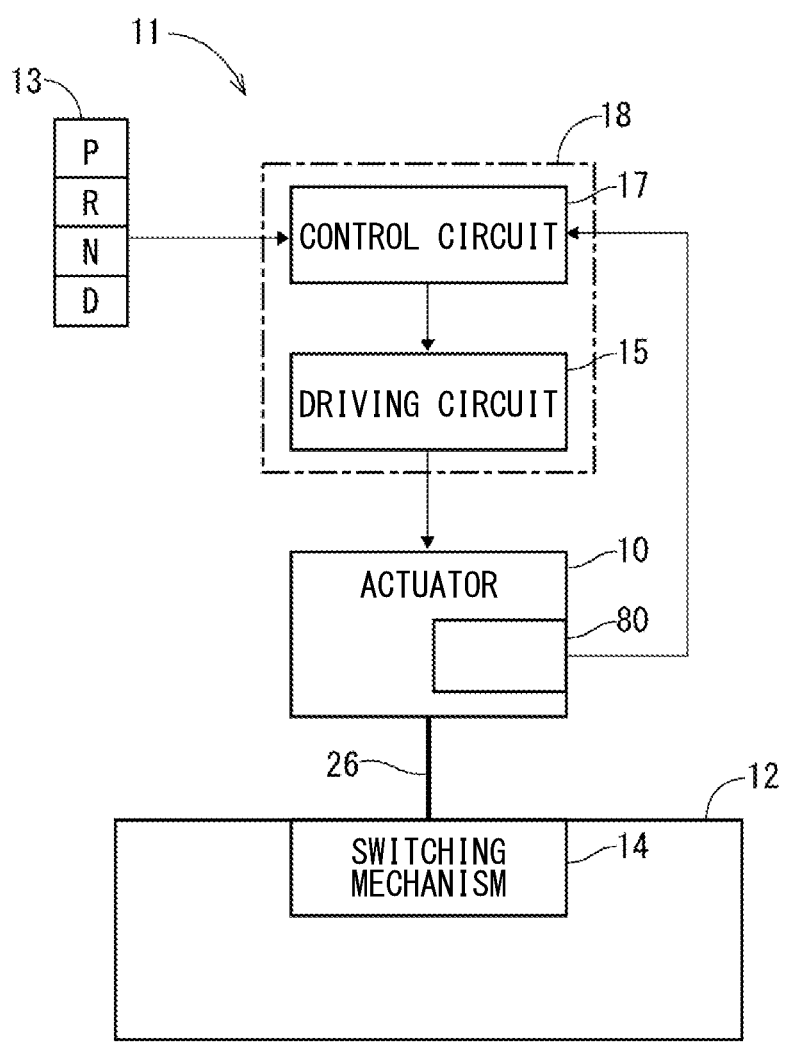
FIG. 1 is a diagram of a shift-by-wire system to which a rotary actuator according to an aspect of this disclosure is applied.

To begin with, examples of relevant techniques will be described.

A rotary actuator is utilized as a driving unit of a shift-by-wire system for a vehicle. An actuator has two shafts that is a motor shaft of a motor and an output shaft located in parallel with the motor shaft. A speed-reducing mechanism is disposed in a driving force transmitting path extending between the motor and the output shaft. The speed-reducing mechanism includes a first speed-reducing portion formed of a sun gear and a ring gear, and a second-speed reducing portion formed of a drive gear and a driven gear that is connected to the output shaft. The drive gear and the driven gear serve as parallel shafts type gears. A rotational speed of the motor is reduced by the first speed-reducing portion and further reduced by the second reducing portion, and the rotation of the motor is transmitted to the output shaft through the driven gear.

The motor and the speed-reducing mechanism are housed in a case. The case includes an upper case housing the motor and a lower case housing the speed-reducing mechanism. The first speed-reducing portion and the second speed-reducing portion are arranged in this order from the motor along an axial direction of the motor. The ring gear is fixed to the upper case with screws.

A mountability is required for a rotary actuator to be used for various kinds of vehicular transmissions, although spatial restriction caused by other components exists. Thus, the rotary actuator needs to be downsized. In contrast, responsiveness and a high torque performance of the rotary actuator in operation needs to satisfy predetermined requirements. Thus, the motor and the speed-reducing mechanism cannot be downsized at the expense of these requirements. The mountability and the requirements should be satisfied at the same time even under a restricted space condition.

The rotary actuator includes the first speed-reducing portion having the ring gear between the motor and the drive gear in an axial direction of the motor. A position of the ring gear and a position of an engagement between the driven gear and the output shaft overlap each other in a radial direction, while the ring gear is located between the drive gear and the output shaft in the radial direction. Therefore, to have the driven gear connected to both the drive gear and the output shaft, the driven gear needs to have a curved portion (i.e., a curved shape) to bypass the ring gear. The curved portion of the driven gear is located outward of the ring gear, and thus a distance between the motor shaft and the output shaft cannot be further reduced.

The present disclosure provides a rotary actuator that improves mountability without sacrificing other performances of the rotary actuator.

A rotary actuator in the present disclosure is used for a shift-by-wire system of a vehicle. The rotary actuator includes a motor having a motor shaft, an output shaft disposed in parallel with the motor shaft, a speed-reducing mechanism configured to reduce a rotational speed of the motor and transmit the rotation of the motor to the output shaft, and a case housing the motor and the speed-reducing mechanism.

The speed-reducing mechanism includes a first speed-reducing portion including a ring gear and a sun gear, and a second speed-reducing portion including a drive gear and a driven gear. The drive gear and the driven gear are coaxially disposed with the motor shaft and the output shaft respectively to serve as so-called parallel shafts type gears. The drive gear is located between the motor and the first speed-reducing portion in an axial direction of the motor.

The second speed-reducing portion and the first speed-reducing portion are arranged in this order in the axial direction away from the motor, and the driven gear thereby need not have a curved portion (i.e., need not be curved) to bypass the ring gear. Accordingly, a distance between the motor shaft and the output shaft can be reduced by a distance of the curved portion. The mountability is improved without sacrificing other properties.

Hereinafter, a rotary actuator (hereinafter, referred to as an actuator) according to an aspect of the present disclosure will be described with reference to drawings. The actuator is used for a driving unit of a shift-by-wire system for a vehicle.

(Shift-by-Wire System)

A configuration of the shift-by-wire system will be described with reference to FIGS. 1 and 2. As shown in FIG. 1, the shift-by-wire system 11 includes a shift operating device 13 that instructs a shift range of a transmission 12, the actuator 10 that drives a shift range switching mechanism 14 of the transmission 12, a driving circuit 15 that energizes the actuator 10, and a control circuit 17. The control circuit 17 controls the driving circuit 15 to drive the actuator 10 based on control signals for the shift range. The driving circuit 15 and the control circuit 17 configures an electronic control unit 18 (hereinafter, referred to as an ECU 18).

Figure 2:
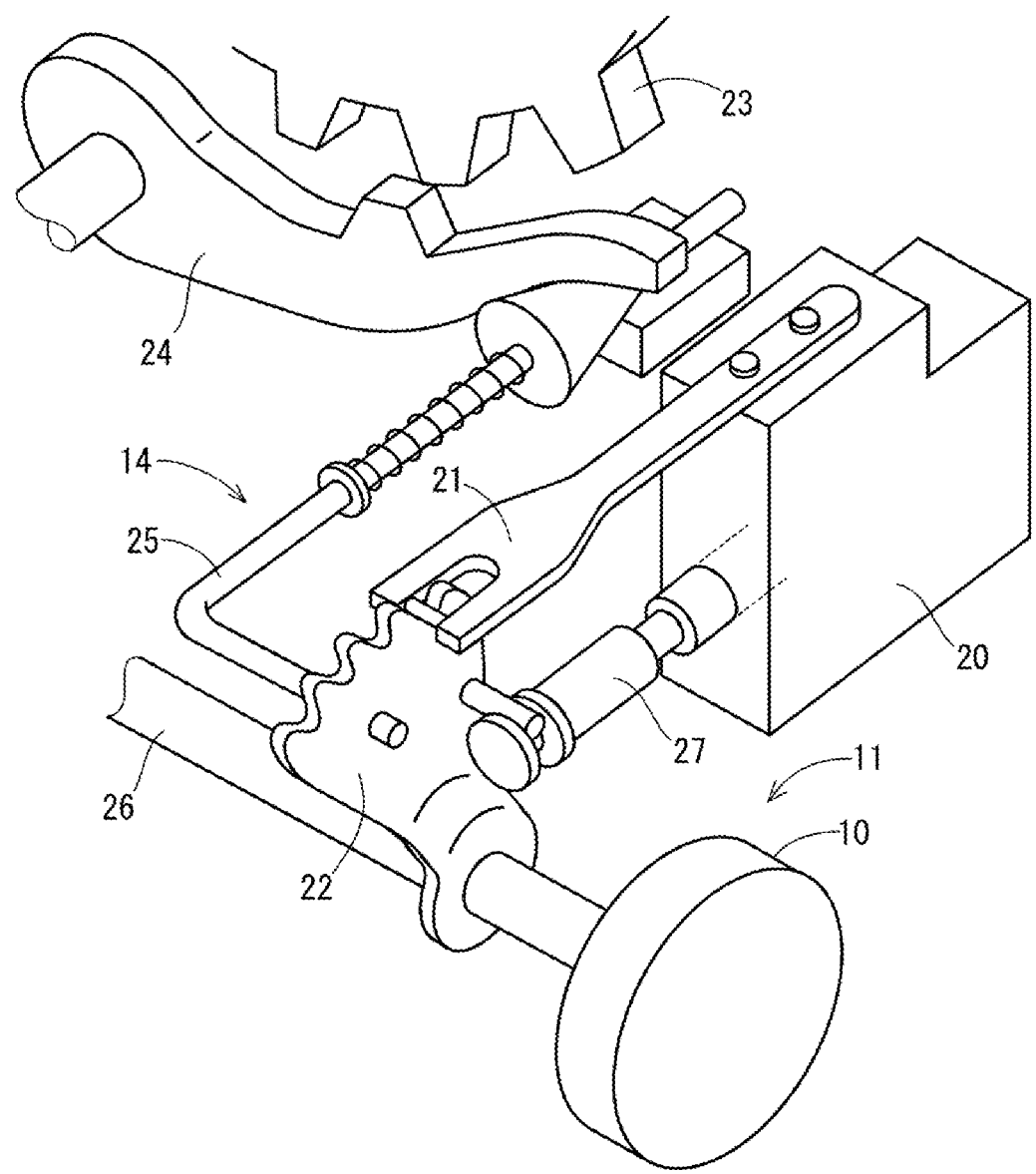
FIG. 2 is a perspective view of a shift range switching mechanism of the shift-by-wire system in FIG. 1.

As shown in FIG. 2, the shift range switching mechanism 14 includes a range switching valve 20, a detent spring 21, a detent lever 22, a park rod 25, and a manual shaft 26. The range switching valve 20 controls an oil pressure to a hydraulic operating mechanism in the transmission 12 as shown in FIG. 1. The detent spring 21 and the detent lever 22 are configured to hold the shift range. The park rod 25 restricts a rotation of the output shaft when the shift range is switched to a parking range by having a park pole 24 fit into a park gear 23 of the output shaft of the transmission 12. The manual shaft 26 rotates together with the detent lever 22.

The shift range switching mechanism 14 rotates the manual shaft 26 together with the detent lever 22 connected to the park rod 25 and a valve body 27 of the range switching valve 20 to shift the park rod 25 and the valve body 27 to positions corresponding to a target shift range. The shift-by-wire system 11 is connected to the actuator 10 to switch the shift range electrically.

(Actuator)

Figure 3:
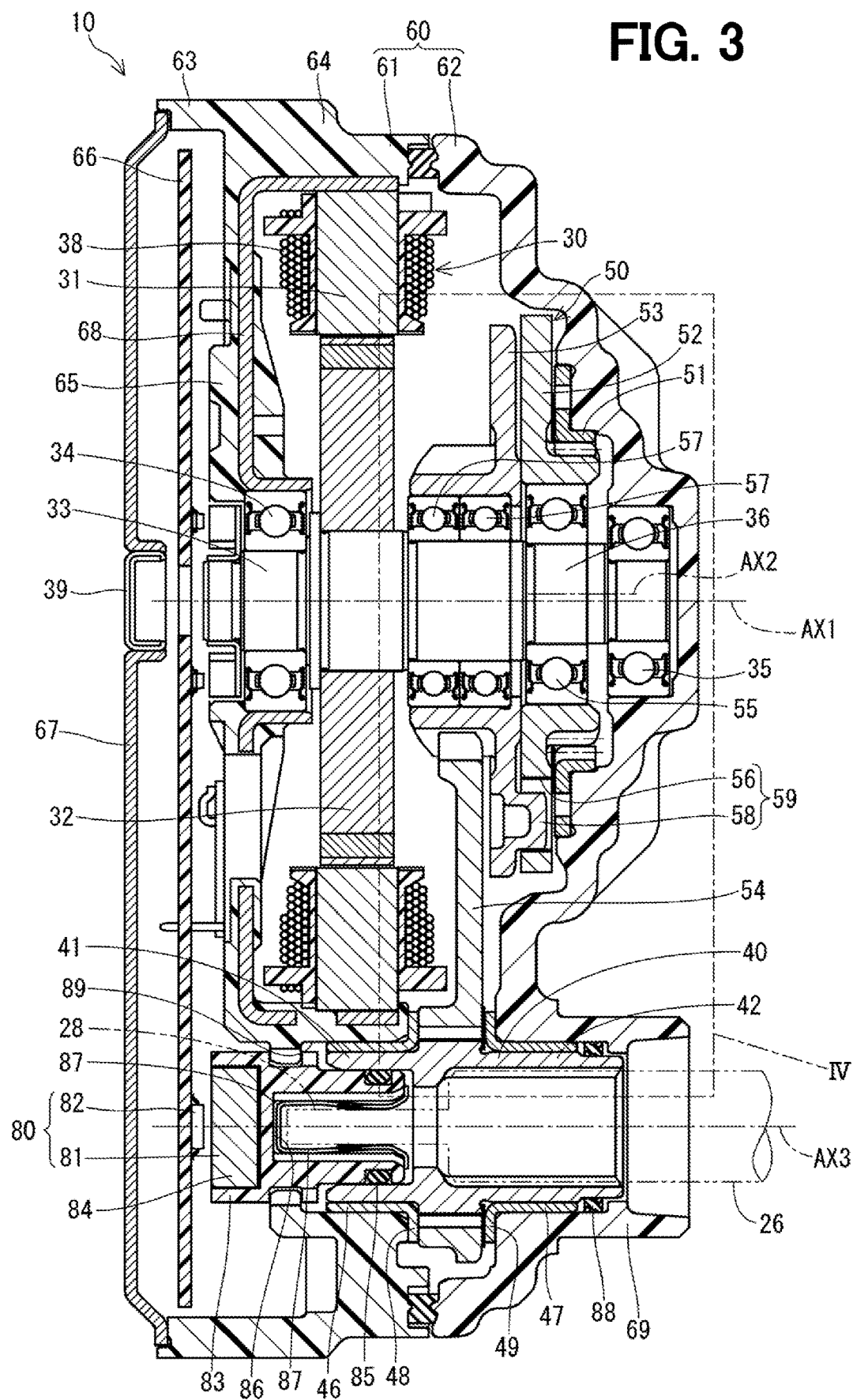
FIG. 3 is a cross-sectional view of the rotary actuator according to the aspect of this disclosure.

Next, a configuration of the actuator 10 will be described. As shown in FIG. 3, the actuator 10 includes a motor 30 as a driving source, an output shaft 40 disposed in parallel with the motor 30, a speed-reducing mechanism 50, a case 60 housing the output shaft 40 and the speed-reducing mechanism 50, and a rotational position detecting sensor 80. The speed-reducing mechanism 50 is configured to reduce a rotational speed of the motor 30 and transmit the rotation of the motor 30 to the output shaft 40.

The case 60 includes an upper case 61 having a tube shape and a lower case 62 having a cup shape. The upper case 61 houses the motor 30, and the lower case houses the speed-reducing mechanism 50. The upper case 61 includes a partition 65 between one end 63 and the other end 64 of the upper case 61. The upper case 61 houses a control board 66 having the driving circuit and the control circuit (shown in FIG. 1) at a side of the partition 65 close to the one end 63. The control board 66 is fixed to the partition 65 by, for example, thermal fusing. The control board 66 is covered with a plate cover 67 made mainly of iron to secure shielding for the control board 66. The lower case 62 is assembled to the other end 64 of the upper case 61. The lower case 62 includes a tubular protrusion 69 protruding away from the upper case 61. The manual shaft 26 is inserted into the tubular protrusion 69.

The upper case 61 includes a plate case 68 at the other end 64. The motor 30 includes a stator 31 press-fit to the plate case 68 of the other end 64, a rotor 32 disposed inside the stator 31, and a motor shaft 33 configured to rotate about a rotary axis AX1 together with the rotor 32. The motor shaft 33 is rotatably supported by both a bearing 34 disposed at the plate case 68 and a bearing 35 disposed at the lower case 63. The motor shaft 33 includes an eccentric portion 36 that is deviated relative to the rotary axis AX1. The eccentric portion 36 is located between the rotor 32 and the lower case 62 in the axial direction. The control circuit (shown in FIG. 1) controls electricity applied to a three-phase winding 38 configuring the stator 31, so that the motor 30 is rotatable in both directions and stoppable at desired positions. The plate cover 67 defines a through hole, and a plug 39 is attached into the through hole. If the actuator 10 is broken down, the motor shaft 33 can be rotated manually by detaching the plug 39.

The speed-reducing mechanism 50 includes the first speed-reducing portion 71 having a ring gear 51 and a sun gear 52, and a second speed-reducing portion 72 having a drive gear 53 and a driven gear 54 that serve as so-called parallel shafts type gears. The ring gear 51 is coaxially disposed with the rotation axis AX1. The sun gear 52 is rotatably supported about a deviated axis AX2 by a bearing 55 that is fit into the eccentric portion 36. The sun gear 52 is engaged with, and inscribed in, the ring gear 51. The sun gear 52 performs a planetary motion that the sun gear 52 revolves around the rotary axis AX1 and rotates about the deviated axis AX2 during the rotation of the motor shaft 33. A rotational speed of the sun gear 52 is reduced relative to a rotational speed of the motor shaft 33. The sun gear 52 defines a hole 56 for transmitting a rotation of the motor shaft 33.

The drive gear 53 is coaxially disposed with the rotary axis AX1 and rotatably supported about the rotation axis AX1 by a bearing 57 that is fit into the motor shaft 33. The drive gear 53 includes a protrusion 58 to be inserted into the hole 56 to receive the rotation of the sun gear 52. The rotation of the sun gear 52 is transmitted to the drive gear 53 through engagement between the hole 56 and the protrusion 58. The hole 56 and the protrusion 58 serve as a transmitting mechanism 59. The driven gear 54 is coaxially disposed with a rotation axis AX3 that is parallel with the rotation axis AX1 and on the same axis with the tubular protrusion 69, and is engaged with and circumscribed on the drive gear 53. The driven gear 54 rotates about the rotation axis AX3 in response to the rotation of the drive gear 53 about the rotation axis AX1. A rotational speed of the driven gear 54 is reduced relative to the rotational speed of the drive gear 53.

The output shaft 40 is formed into a cylindrical shape and coaxially disposed with the rotation axis AX3. The partition 65 defines a supporting through hole 89 coaxial with the rotation axis AX3. The output shaft 40 is rotatably supported about the rotation axis AX3 by both a first collar bushing 46 and a second collar bushing 47. The first collar bushing 46 and the second collar busing 47 are fit into the supporting through hole 89 and the tubular protrusion 69, respectively. The driven gear 54 is a different component from the output shaft 40. The driven gear 54 is mechanically connected to the output shaft 40 by being fit to an outer part of the output shaft 40 to transmit the torque to the output shaft. The manual shaft 26 is inserted into the output shaft 40 and connected to the output shaft by, for example, a spline fitting to receive the rotary force.

An end 41 of the output shaft 40 is rotatably supported by the first collar bushing 46. The other end 42 of the output shaft 40 is rotatably supported by the second collar bushing 47. The driven gear 54 is supported in an axial direction of the output shaft 40 by being clamped between a first collar 48 of the first collar bushing 46 and a second collar 49 of the second collar bushing 47. In other embodiment, the driven gear 54 may be supported in the axial direction by being clamped between a pair of supporters formed of the case 60, other plates, or the like.

The rotational position detecting sensor 80 includes a magnetic circuit 81 and a magnetic sensor 82. The magnetic circuit 81 is attached to the output shaft 40. Specifically, the magnetic circuit 81 is integrally formed with a holder 83 and a magnet 84. A position of the holder 83 in a thrust direction of the holder 83 is restricted by the upper case 61 and a position of the holder 83 in a radial direction of the holder 83 is also restricted by the output shaft. The rotational position detecting sensor 80 detects rotational positions of the output shaft 40 and the manual shaft 26 rotating together with the output shaft 40, and outputs detection results to the ECU 18. In other embodiments, the magnetic circuit may be disposed at the output shaft 40 or an element rotating together with the output shaft 40 (e.g., the manual shaft). The holder of the magnetic circuit may be integrally formed with the output shaft 40 or the manual shaft 26, and the magnet of the magnetic circuit may be fixed to the holder by adhesion or integral molding.

The holder 83 is inserted into the end 41 of the output shaft 40. An O-ring 85 is disposed between the holder 83 and the end 41. The holder 83 defines a bottomed hole 86 at an end of the holder 83 facing the output shaft 40. A spring 87 is fit into the bottomed hole 86. The spring 87 holds a dihedral width part 28 formed at an end of the manual shaft 26 by a spring force in a direction to reduce a space between the manual shaft 26 and the bottomed hole 86.

An X-ring 88 is disposed between the other end 42 of the output shaft 40 and the tubular protrusion 69. Conventionally, a sealing member sealed a space between the transmission of the actuator and a transmission case. In this disclosure, however, the X-ring 88 is disposed between the other end 42 and the tubular protrusion 69, thus sealing between the other end 42 and the tubular protrusion 69 is secured without an additional sealing member as conventionally used.

(Speed-Reducing Mechanism)

Figure 4:
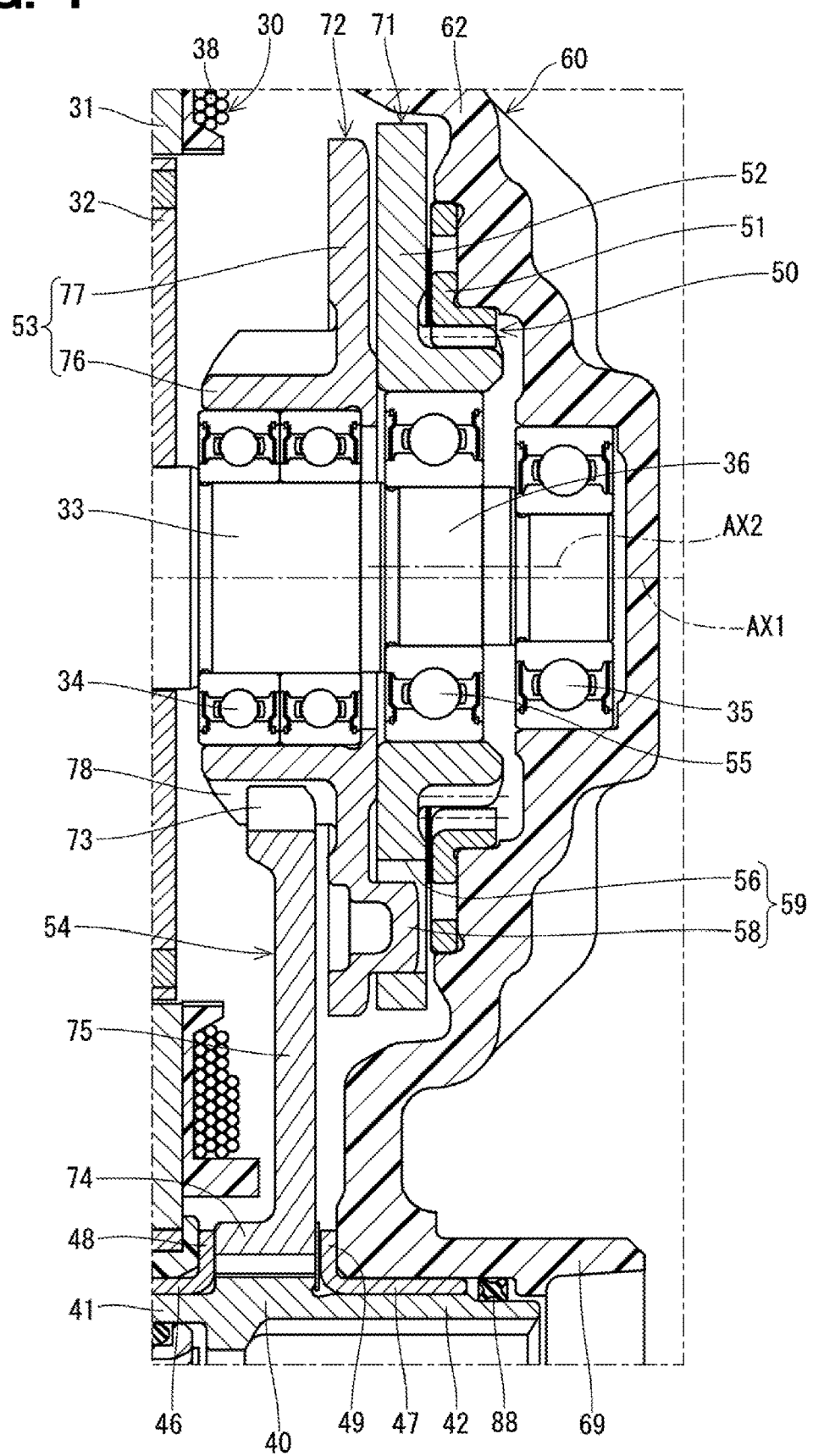
FIG. 4 is an enlarged view of IV part in FIG. 3.

Next, a configuration of the speed-reducing mechanism 50 and related parts will be described. As shown in FIG. 4, the ring gear 51 is fixed to the lower case 62 by press-fitting in this embodiment. In other embodiment, the ring gear 51 may be insert-molded with the lower case 62, or fixed with fastening members such as screws.

The drive gear 53 is located between the motor 30 and the first speed-reducing portion 71 in the axial direction of the motor 30. That is, the drive gear 53 is located in a space between the motor 30 fixed to the upper case 61 and the first speed-reducing portion 71 fixed to a bottom part of the lower case 62. Accordingly, the drive gear 53 and the ring gear 51 overlap with each other in the axial direction.

The driven gear 54 includes an engaging portion 73 engaged with the drive gear 53, a fitting portion 74 into which the output shaft 40 is fit, and a plate portion 75. The plate portion 75 linearly extends between the fitting portion 74 and the engaging portion 73 in the radial direction to connect the fitting portion 74 and the engaging portion 73 to each other. A position of the fitting portion 74 in the axial direction and a position of the engaging portion 73 in the axial direction overlap with each other. A thickness of the engaging portion 73 is greater than that of the plate portion 75 to secure a strength of the gear.

The sun gear 52 defines the hole 56 for the transmitting mechanism 59, and the drive gear 53 includes the protrusion 58. The hole 56 overlaps with the bearing 55 supporting the sun gear 52 in the axial direction. Similarly, a fitting configuration between the protrusion 58 and the hole 56 overlaps with the bearing 55 in the axial direction.

The drive gear 53 includes a protrusion formed as a difference between a small diameter portion 76 and a large diameter portion 77. The small diameter portion 76 is located between the motor 30 and the large diameter portion 77. In other words, the small diameter portion 76 is located on a side of the large diameter portion 77 opposite to the sun gear 52. The protrusion 58 protrudes from an outer circumferential surface of the large diameter portion 77 in the axial direction. The drive gear 53 includes a hook 78 engaged with the driven gear 54 at a position inward of the protrusion 58 in the radial direction of the motor 30. The hook 78 does not entirely extend in the axial direction of the drive gear 53. In other words, the hook 78 extends up to a middle position of the drive gear 53 in the axial direction.

As described above, in this embodiment, the actuator 10 includes the motor 30 having the motor shaft 33, the output shaft 40 disposed in parallel with the motor shaft 33, the speed-reducing mechanism 50 configured to reduce the rotational speed of the motor 30 and transmit the rotation of the motor 30 to the output shaft 40, and the case 60 housing the motor 30 and the speed-reducing mechanism 50.

The speed-reducing mechanism 50 includes the first speed-reducing portion 71 including the ring gear 51 and the sun gear 52, and the second speed-reducing portion 72 including the drive gear 53 and the driven gear 54 coaxially disposed with the motor shaft 33 and the output shaft 40, respectively. The drive gear 53 and the driven gear 54 serve as so-called parallel shafts type gears. The drive gear 53 is disposed between the motor 30 and the first speed-reducing portion 71 in the axial direction of the motor 30.

The second speed-reducing portion 72 and the first speed-reducing portion 71 are arranged in this order from the motor 30 in the axial direction so that the driven gear 54 bypasses the ring gear 51 without having a curved portion (a curved shape) as described above. In other words, the ring gear 51 is not located between the drive gear 53 and the output shaft 40 in the radial direction. Accordingly, a distance between the motor shaft 33 and the output shaft 40 can be reduced by a distance of the curved portion. Therefore, the mountability can be improved without offsetting other properties of the actuator 10.

The driven gear 54 can be reduced in weight by eliminating the curved portion, and inertia can be also reduced. Accordingly, a vibration proof, a responsiveness, and controllability of positions can be improved.

In this embodiment, the case 60 includes the upper case 61 that has a tubular shape to house the motor 30, and the lower case 62 that has a cup shape to house the speed-reducing mechanism 50. The ring gear 51 is fixed to the lower case 62. Accordingly, the first speed-reducing portion 71 is disposed closer to the lower case 62 to keep a space for arranging the second speed-reducing portion 72 between the motor 30 and the first speed-reducing portion 71.

In this embodiment, the driven gear 54 includes the engaging portion 73 engaged with the drive gear 53, the fitting portion 74 into which the output shaft 40 is fit, and the plate portion 75 linearly extends between the fitting portion 74 and the engaging portion 73 to connect the fitting portion 74 and the engaging portion 73. Accordingly, the weight of the driven gear 54 can be reduced by eliminating the curved portion, and the inertia can be reduced. The vibration proof, the responsiveness, and the controllability of positions can be improved.

In this embodiment, the sun gear 52 defines the hole 56 for rotation transmission. The drive gear 53 includes the protrusion 58 fit into the hole 56 for receiving the rotation and the hook 78 engaged with the driven gear 54 at a position radially inward of the protrusion 58. The hook 78 is disposed relatively inward in the radial direction, thereby increasing a gear ratio of the second speed-reducing portion 72. Accordingly, the gear ratio equal to or greater than before can be secured while reducing the distance between the motor shaft 33 and the output shaft 40. Thus, the actuator 10 can be downsized. In addition, such configuration can reduce a load applied to a gear-engaging portion of the second speed-reducing portion 72. Therefore, a width of the driven gear 54 can be reduced, and the actuator 10 can be thereby thinner.

When a target reduction ratio of the speed-reducing mechanism 50 is not largely changed, the hook 78 may be disposed relatively inward to increase the gear ratio of the second speed-reducing portion 72 and to reduce a gear ratio of the first speed-reducing portion 71. Thus, the first speed-reducing portion 71 can be downsized and lightened. The small and light ring gear 51 and the sun gear 52 can improve the vibration proof, the responsiveness, and the control accuracy of positions.

A load applied point of the sun gear 52 is located closer to a center of the bearing 55 supporting the sun gear 52 in the axial direction, as compared with a configuration where the drive gear 53 defines a hole and the sun gear 52 has a protrusion fit into the hole. The load applied point is a center of a contacting portion between the hole 56 and the protrusion 58. Thus, a load against the bearing can be reduced, and only one bearing 55 can be used while the conventional actuator usually includes two or more bearings.

OTHER EMBODIMENTS

In other embodiments, the drive gear may define the hole and the sun gear includes the protrusion fit into the hole. The hook may be located at a position radially outward the protrusion.

The present disclosure is not limited to embodiments described above, and achieved in various embodiments unless separating from the gist of the present disclosure.

What is claimed is:

1. A rotary actuator for a shift-by-wire system of a vehicle, the rotary actuator comprising:
    a motor including a motor shaft;
    an output shaft disposed in parallel with the motor shaft;
    a speed-reducing mechanism configured to reduce a rotational speed of the motor and transmit the rotation of the motor to the output shaft; and
    a case housing the motor and the speed-reducing mechanism, wherein
    the speed-reducing mechanism includes:
        a first speed-reducing portion including a ring gear and a sun gear; and
        a second speed-reducing portion including a drive gear and a driven gear, the drive gear and the driven gear coaxially disposed with the motor shaft and the output shaft, respectively, to serve as parallel shafts type gears, and
    the drive gear is disposed between the motor and the first speed-reducing portion in an axial direction of the motor;
    the motor, the drive gear, and the first speed-reducing portion are overlapped with each other in the axial direction of the motor;
    one of the drive gear and the sun gear includes a protrusion,
    the other of the drive gear and the sun gear defines a hole therein, and
    the protrusion is press-fitted into the hole such that the drive gear and the sun gear are connected to each other in the axial direction for transmitting a rotary force generated by rotation of the sun gear to the drive gear.

2. The rotary actuator according to claim 1, wherein
the case includes an upper case housing the motor and a lower case housing the speed-reducing mechanism, and
the ring gear is fixed to the lower case.

3. The rotary actuator according to claim 1, wherein
the driven gear includes:
    an engaging portion engaged with the drive gear;
    a fitting portion into which the output shaft is fit; and
    a plate linearly extending between the fitting portion and the engaging portion in a radial direction of the motor to connect the engaging portion and the fitting portion to each other.

4. The rotary actuator according to claim 1, wherein
the sun gear defines the hole for transmitting the rotation of the motor, and
the drive gear includes the protrusion press-fit into the hole for transmitting the rotation and a hook engaged with the driven gear at a position inward of the protrusion in a radial direction of the motor.

5. The rotary actuator according to claim 1, wherein
the drive gear is configured to rotate relative to the motor shaft,
the sun gear is connected to the motor shaft and is configured to perform a planetary motion along the ring gear by rotation of the motor shaft, and
the drive gear is configured to rotate relative to the motor shaft in accordance with the planetary motion by the sun gear.

6. The rotary actuator according to claim 4, wherein
the hook extends up to a middle position of the drive gear in the axial direction.

7. The rotary actuator according to claim 1, wherein
the sun gear is rotatably supported by a bearing; and
the hole overlaps with the bearing supporting the sun gear in the axial direction.

8. The rotary actuator according to claim 1, wherein
the sun gear is rotatably supported by a bearing; and
a fitting configuration between the protrusion and the hole overlaps with the bearing in the axial direction.

* * * * *